No. 12,161. REISSUED OCT. 13, 1903.

R. STANTON.

JOINT SUPPORT.

APPLICATION FILED JULY 20, 1903.

ATTEST.

T. B. Moser

R. Zbornik

INVENTOR.

Ray Stanton

BY H. T. Fisher

ATTY

THE NORRIS PETERS CO., PHOTO-LITHO., WASHINGTON, D. C.

No. 12,161. Reissued October 13, 1903.

UNITED STATES PATENT OFFICE.

RAY STANTON, OF PORTLAND, OREGON, ASSIGNOR OF ONE-HALF TO THOMAS TAYLOR, OF PORTLAND, OREGON.

JOINT-SUPPORT.

SPECIFICATION forming part of Reissued Letters Patent No. 12,161, dated October 13, 1903.

Original No. 724,349, dated March 31, 1903. Application for reissue filed July 20, 1903. Serial No. 166,557.

*To all whom it may concern:*

Be it known that I, RAY STANTON, a citizen of the United States, residing in Portland, in the county of Multnomah and State of Oregon, have invented certain new and useful Improvements in Joint-Supports; and I do declare that the following is a full, clear, and exact description of the invention, which will enable others skilled in the art to which it appertains to make and use the same.

My invention is in the nature of an improved plumber's supply article, referred to herein as a "joint-support;" and the object of the invention is to provide a simple and effective hard-metal tubular member having a nipple end especially designed for conveniently, accurately, and positively supporting a soft-metal pipe-section or pipe during the operation of making a wiped joint, and whereby the said hard-metal member is firmly connected with a soft-metal lead section or pipe, substantially as shown and described.

My invention therefore comprises a peculiar and novel construction of nipple or hard-metal tubular member or support, and in its more specific nature comprises an improved wiped joint, hereinafter fully described in detail, and specifically pointed out in the claims, reference being had to the accompanying drawings, in which—

Figure 1:
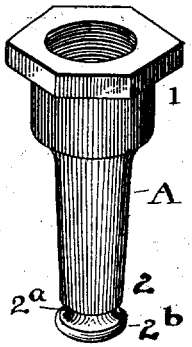
Figure 2:
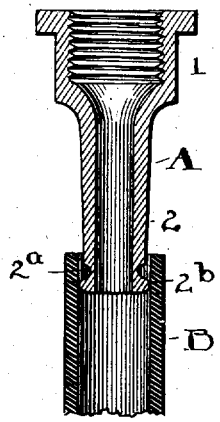
Figure 3:
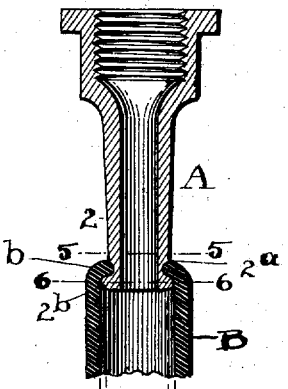
Figure 4:
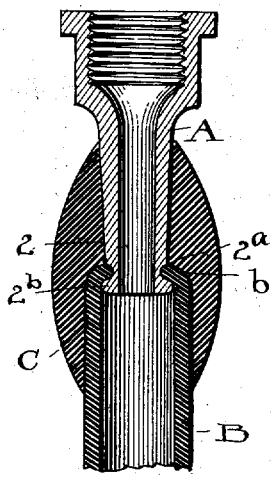
Figure 5:
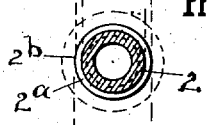
Figure 6:
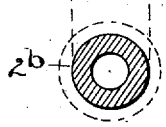

Figure 1 is a perspective view of my improved joint-holder alone as an article of manufacture. Fig. 2 is a vertical section of the same, showing a section or piece of lead pipe slipped over the sustaining or nipple end of the holder, but not fastened. Fig. 3 shows the lead pipe bent inward at its end all around and engaged in the groove in the extremity of the holder and hung on the end bead thereof. Fig. 4 is a longitudinal sectional view of the holder and piece of lead pipe thereon, as in Fig. 3, and provided with a lead wiping. Figs. 5 and 6 are cross-sections taken on lines 5 5 and 6 6, respectively, Fig. 3.

A is the joint holder or support and has an interiorly-threaded end 1 and a relatively reduced or smaller nipple end 2. The larger end 1 may be of any desired form, as the construction of said end is immaterial to my invention. The opposite or smaller end 2 is the nipple end and has an annular bead or rib $2^b$ at its extremity and an annular groove $2^a$ immediately above said bead. This construction of end 2 of said support A, with groove $2^a$ and bead $2^b$ of relatively about the same width in cross-section, enables me to make a suspensory or initial connection therewith of a soft-metal pipe B of a size interiorly about the same as said nipple end without doing violence to the pipe. Thus assuming said pipe to be of lead and that a wipe-joint with holder A is to be made I can accommodate a pipe to said nipple end whether it be of larger or smaller internal diameter with about equal facility and without impairing the pipe or the joint in either case, because if the bore or interior of the lead pipe be larger than bead $2^b$, so as to slip loosely over the same, the edge or end thereof can be readily bent or swaged inward to produce an annular rim *b*, occupying groove $2^a$—say as in Fig. 3—thereby supporting pipe B, without any other sustaining means for said pipe while it is being wiped, or if the lead pipe be smaller than said bead I can easily spread or flare the same about its end or edge the slight depth required, and having flared or enlarged it just sufficiently to pass over bead $2^b$ the flared or spread stock at the end or edge can be bent into groove $2^a$ and engagement be made practically the same or with the same practical effect, as seen in Fig. 3, and so as to firmly support the pipe thereon. This gives the plumber an advantage in wipe-joint construction not hitherto known and of very material value, because as lead pipes go they vary considerably in size and weight in different parts of the country and with different manufacturers, while my nipple-support necessarily is of only a single standard size. Hence in one place a pipe may be found which will require more or less enlarging to engage it over bead $2^b$, and in another place it may be considerably larger than the nipple, leaving an open space between all around. In either or both cases the pipe is readily adaptable to the nipple by my method of connecting the same thereby. This also emphasizes the materiality of a narrow bead directly at the end of the nipple, with the engaging groove directly next thereto and also practically at the immediate end of the nipple, as occurs by making the bead narrow, for by such construction a larger or a smaller pipe is easily adapted thereto and the support is made to serve its purpose without more than a moment's labor for adaptation if the pipe be smaller and without impairing the end of the pipe in any way. Such union then usually becomes the center or middle of the wipe C, Fig. 4, and the strength of the union is also materially enhanced by reason of the mechanical engagement of pipe B in groove or channel 2[a]. There is also the additional and material advantage of fixing the end of the pipe B definitely where it is to remain and at the same time so closing the joint that the molten metal of the wipe cannot possibly creep inside. It has been a common experience in wipe-joints that somehow and through one reason or another, especially when dealing with pipes a little large, the solder or flowing metal has run more or less inside the pipe and formed obstructions therein. With my construction of joint no stringy or like obstructions get into the pipe, and a perfect union is effected.

Figs. 5 and 6 show the proportional diameters or cross-sections of the nipple end of support A on the respective lines 5 5 and 6 6, Fig. 3.

What I claim is—

1. In a wiped joint, the combination of a hard-metal member having a nipple end with an annular bead at its extremity and an annular groove next above the bead, a soft-metal pipe having an inturned edge engaging over the said bead into said groove, and a lead wiping surrounding the nipple end of the said hard-metal member and the upper end of the lead pipe, substantially as described.

2. As a new article of manufacture, a hard-metal wipe-joint support, having its immediate extremity formed with an annular bead and an annular groove directly above said bead, the said bead and groove being of substantially the same width each in cross-section, substantially as described.

Witness my hand to the foregoing specification this 13th day of June, 1903.

RAY STANTON.

Witnesses:
C. A. BELL,
AGNES C. MCINTOSH.